April 21, 1931. J. F. DE TÓVÁROS 1,802,076
TILTABLE CURRENT COLLECTOR PLATE FOR OVERHEAD
CONDUCTORS OF ELECTRIC RAILWAYS
Filed May 31, 1929
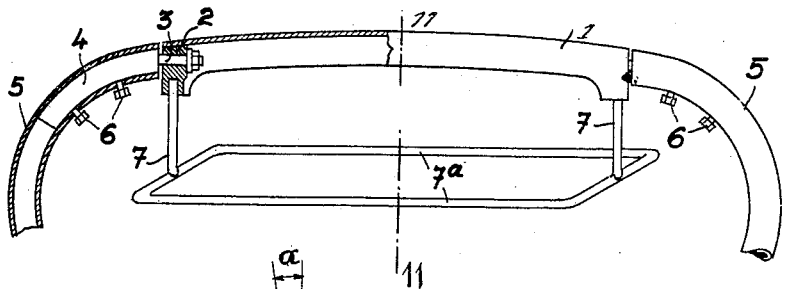
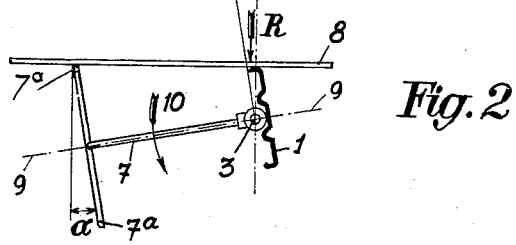
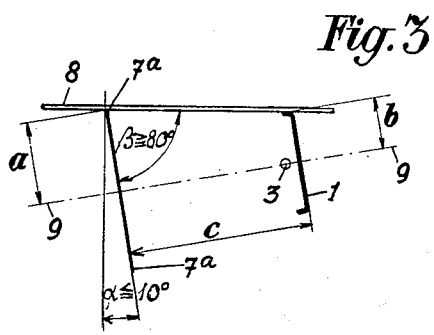 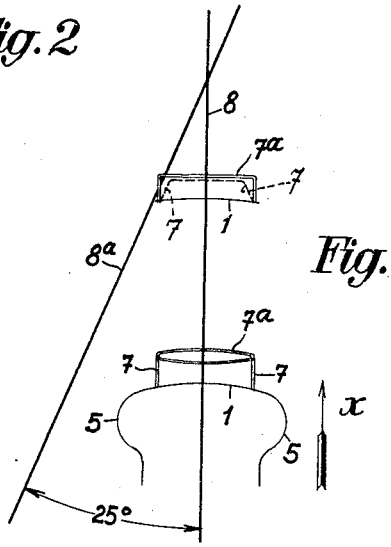
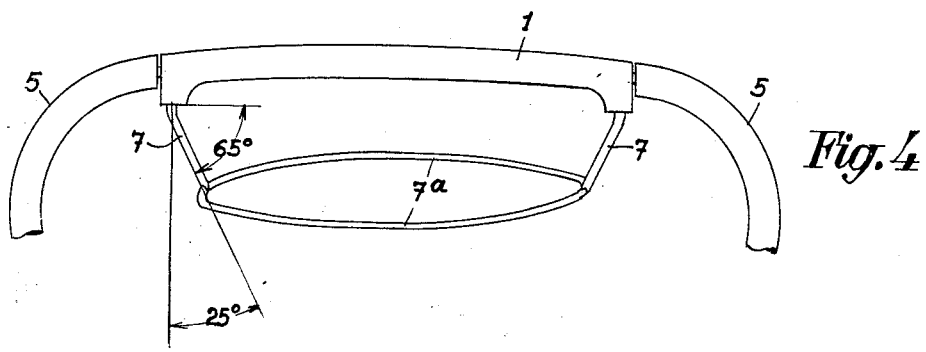
Inventor:
Julius Fischer de Tóváros
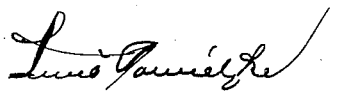
Attorney Patented Apr. 21, 1931

1,802,076

UNITED STATES PATENT OFFICE

JULIUS FISCHER DE TÓVÁROS, OF BUDAPEST, HUNGARY

TILTABLE CURRENT-COLLECTOR PLATE FOR OVERHEAD CONDUCTORS OF ELECTRIC RAILWAYS

Application filed May 31, 1929. Serial No. 367,312.

The present invention relates to current collector plates fitted, for the purpose of ensuring the horizontal position of the plate which contacts with the overhead conductor, with counter-weights having the shape of a vertical frame and capable of being rotated, together with the contact plate; in which counter-weights, which are themselves devices per se known, the bottom part of the frame itself consists of a separate horizontal frame.

In these current collectors in cases when the contact plate is tilted owing to some obstacle or frictional resistance encountered during the progress of the vehicle, one of the longitudinal sides of the horizontal bottom part of the counterweight frame will strike against the overhead conductor, and will thus prevent the toppling over of the contact plate. In view of this circumstance the bottom frame part, the plane of which is at right angles to the median plane of the collector, is made of such dimensions as to ensure that the distance of the longitudinal sides of the bottom frame part from the median plane mentioned is of such magnitude as to make these longitudinal sides, in case the current collector contact plate is tilted, strike against the overhead conductor before the contact plate can assume a position at right angles to the overhead conductor.

In order to fulfill this condition, it is sufficient, theoretically, that the distance of the longitudinal sides of the bottom frame part from the median plane of the trolley should be at least one-half of the greatest width of the contact plate. The greater the distance, the larger the angle formed by the bottom frame part with the vertical at the moment of its striking against the overhead conductor; the larger this angle, the greater the certainty with which the bottom frame part will prevent the toppling over of the current collector plate. Theoretically the magnitude of this angle is in fact irrelevant, because if this angle be ever so small, the bottom frame part will always prevent the contact-plate from assuming a vertical position; in reality, however, the magnitude of this angle must not be less than a certain value, for reasons of a practical nature to be explained below. Taking this into account there is obtained, according to the invention, a double-frame counter-weight corresponding to practical requirements, by the means described below, by making the mutual distance of the longitudinal sides of the bottom frame part ⅕th larger than the maximum width of the contact plate.

In the case of frame-shaped counter-weights, it may happen that the bottom part of the counter-weight strikes against the overhead conductor, and the bottom part of the frame as well as one edge of the contact plate remain, during the progress of the vehicle, in a position in which they are in contact with the overhead conductor; if now the collector, in this position, continues its travel on the overhead conductor and reaches a point of the overhead conductor where there is a switching point conductor or crossing the front frame part, which, as mentioned, has remained in contact with the overhead conductor, will, at such point, get above the conductor situated at a lower level or get between the two conductors and there get stuck, and possibly it may tear down the whole overhead conductor. In order to eliminate this drawback, the vertical legs of the frame-shaped counter-weight are, according to the invention, preferably arranged in an inclined instead of in a vertical position, so that in the vertical plane of projection, the double-frame will not have the shape of a rectangular quadrangle, but of a trapezoid. As the largest angle for switching points or crossings occurring in practice is about 25°, it will be advantageous to choose the angle formed by the inclined legs of the trapezoidal frame with the vertical so as to exceed 25°; in this case the possibility of the front frame part getting stuck; as mentioned above, and of the overhead conductor being torn down, is avoided with full certainty.

In the drawings annexed,

Fig. 1 is a lateral perspective view, partly in section, of one embodiment of the invention.

Fig. 2 is an end view and partly a cross-section of the same.

Fig. 3 is a diagram showing the conditions under which the invention is used.

Fig. 4 is a lateral perspective view of another embodiment of the counter-weight frame.

Fig. 5 is a plan view on a reduced scale, showing the method employed for preventing the frame from getting stuck at conductor crossings.

In Fig. 1, the plate 1, of straight or suitably-curved shape, is capable of being tilted, and is designed to contact with the overhead conductor 8. At the ends of this contact plate, bearing lugs 2 are provided which receive on the one hand, the pivots 3 of the contact plate and to which are attached on the other hand, the top ends of the vertical legs 7 of the counter-weight. The bent parts 4 of pivots 3 are pushed partly into the ends of the tubular legs 5 of the lyre-shaped frame 5 and are fixed in position by means of bolts 6. The bottom part of the counter-weight consists itself of a separate frame, the two longitudinal sides 7a of which ensure that in case the contact plate 1 is tilted owing to some obstacle or frictional resistance, one longitudinal side 7a of the bottom part of the counter-weight will strike against the overhead conductor 8 (Fig. 2), thus preventing the tilting over of the contact plate 1. Each longitudinal side 7a is situated at such a distance from the median plane 9—9 of the trolley frame as to ensure that as soon as contact plate 1 is tilted in one or the other direction (according to the direction of travel of the vehicle), one other frame side 7a will strike against the overhead conductor 8 even before contact plate 1 can assume a position at right angles to said conductor. Thus contact plate 1 cannot topple over; in fact, the torque exerted on the trolley by the pressure R which is being exerted on the trolley, will, moreover, tend to turn the contact plate back in the direction indicated by arrow 10.

Theoretically, the bottom frame part of the counter-weight will prevent contact plate 1 from reaching a vertical position if the distance of longitudinal side 7a from the median plane 9—9 exceeds half the maximum width of contact plate 1 by the smallest imaginable amount, or in other words, if the distance of the longitudinal sides 7a exceeds the maximum width of contact plate 1 (which maximum width is to be found in the central plane marked 11—11 on Fig. 1) by ever so little. Theoretically, therefore, angle $\alpha$ shown on Fig. 2 may be ever so small. The less the difference between the distance across the longitudinal sides 7a and the width of contact plate 1, the smaller is angle $\alpha$ shown on Fig. 2. In actual practice, however, angle $\alpha$ must not be diminished beyond a certain limit, as otherwise, on the one hand, the longitudinal side 7a might easily slip across below the overhead conductor 8, i. e. contact plate 1 might easily topple over, and on the other hand, pressure R might otherwise be unable to exert an appreciable amount of torque.

For practical reasons, it will be advisable to take 10° as the minimum value for angle $\alpha$, i. e. this would be the angle at which the device, when striking against the overhead conductor 8, will with sufficient safety prevent the toppling over of contact plate 1. Accordingly, practical requirements will, according to the invention, be satisfied, if the distance between the longitudinal sides 7a of the bottom part of the frame is made at least 1/5th longer than the maximum width of contact plate 1. According to the invention, this condition may be demonstrated, on the basis of Fig. 3, in the following manner: On Fig. 3.

"$a$" is the distance between the longitudinal side 7a and the median plane 9—9, i. e. half the distance between the two longitudinal sides 7a, "$b$" is half the maximum width of contact plate 1.

"$c$" is the distance between the bottom frame and the contact plate 1, i. e. approximately the length of leg 7 of the counter-weight, "$\alpha$" is the angle mentioned in connection with Fig. 2, which angle is formed by the plane of the bottom frame and the vertical.

"$\beta$" is the complementary angle of $\alpha$, i. e. the angle between the plane of the bottom frame and the overhead conductor at the moment when the bottom frame impinges on the overhead conductor 8.

According to Fig. 3:

$$\frac{c}{a-b} = \tangent \beta$$

in practice, distance "$c$" must at least be equal to "$b$" as otherwise it would be impossible to assemble and mount the trolley properly. In the following equations "$c$" and "$\alpha$" are taken at their minimum permissible values. In this way it is shown that the width of the bottom frame should exceed the width of the contact plate by at least one-fifth part. Therefore $c=b$, and in this case $$\frac{b}{a-b} = tg\beta$$

from which equation it follows that $$b = a\,tg\beta - b\,tg\beta,$$

and consequently $$a = \frac{b + tg\beta}{tg\beta}, \text{ or } a = b \cdot \frac{1 + tg\beta}{tg\beta}$$

As according to the above, $\alpha$ is at least 10°, and therefore $\beta$ is not more than 80°, therefore $$a \geq b \cdot \frac{1 + tg80°}{tg80°}$$

and so $$a \geq 1.2\,b$$

The mutual distance of the two longitudinal sides $7a$ being $2a$, while the maximum width of contact plate 1 is $2b$, it follows, that according to the formula obtained $$2a \geq 1.2\,b.$$

The mutual distance of the two longitudinal sides $7a$ should therefore exceed the greatest width of contact plate 1, by at least one-fifth part.

According to Fig. 4, the legs 7 of the counter-weight are preferably arranged in an inclined instead of in a vertical position, a counter-weight frame of trapezoidal shape being thus obtained. The advantages of this arrangement may be seen from Fig. 5, which is a view from above of the mutual positions arising in the case of crossing conductors between the trolley mechanism and the overhead conductors 8, 8a, supposing, by way of example, that conductor 8a is situated at a slightly lower level than conductor 8.

While the vehicle, together with the collector frame 5, approaches the crossing in the direction of arrow $x$, it may easily happen that the device occupies the position shown in Fig. 2, in which one of the edges of contact plate 1 and one longitudinal side $7a$ of the counter-weight comes into contact with the overhead conductor 8 and remains in this position. If the collector reaches the crossing in this position, it may easily happen that one part of the counter-weight, while being in contact with overhead conductor 8 from below, will get above conductor 8a, i. e. it will get between conductors 8 and 8a in such a manner as to get stuck there and may tear off the whole overhead conductor. If, on the other hand, the legs 7 of the counter-weight frame are arranged in an inclined position, as shown in dotted lines in Fig. 5, the drawback referred to can be avoided, for in this case the counter-weight frame will, during the progress of the vehicle, slip out from between the two overhead conductors and thus cannot get stuck. The largest switching or crossing angle occurring in practice being about 25°, the angle will be chosen which is formed by the inclined legs of the counter-weight of trapezoidal form with the base of the trapezoid (the contact plate 1) so as to be smaller than 65°, i. e. the angle formed, according to Fig. 4, by the legs 7 with the vertical so as to be larger than 25°, in which case the drawback mentioned is certain to be avoided.

The invention may be applied to current collectors made of sheet metal as well as to those made of coal, also to current collectors in which the sliding contact surface is mounted in the form of a separate piece, or several separate pieces, on a separate supporting surface situated below the sliding contact surface.

What I claim is:

1. A tiltable current collector plate for overhead conductors of electric railways, comprising a frame-shaped counter-weight the bottom member of which consists itself of a separate frame, the distance between the longitudinal sides of said member exceeding the maximum width of the current collector plate by at least one-fifth part.

2. A tiltable current collector plate for overhead conductors of electric railways, comprising a frame-shaped counter-weight, the bottom member of which consists itself of a separate frame, the distance between the longitudinal sides of said member exceeding the maximum width of the current collector plate by at least one-fifth part, while the vertical portion of the counter-weight frame has inclined sides, so that the counter-weight frame presents in the vertical projection plane a trapezoidal shape.

3. A tiltable current collector plate for overhead conductors of electric railways, comprising a frame-shaped counter-weight, the bottom member of which consists itself of a separate frame, the distance between the longitudinal sides of said member exceeding the maximum width of the current collector plate by at least one-fifth part, while the vertical part of the counter-weight frame possesses inclined sides, so that the counter-weight frame is of trapezoidal form in the vertical plane of projection, the angle formed by the inclined sides with the vertical exceeding 25°.

In testimony whereof I affix my signature.

JULIUS FISCHER DE TÓVÁROS.